United States Patent [19]

Sugerman et al.

[11] Patent Number: 4,715,968

[45] Date of Patent: Dec. 29, 1987

[54] NON-BLOOMING ANTISTATIC AGENTS

[75] Inventors: Gerald Sugerman, Allendale, N.J.; Salvatore J. Monte, Staten Island, N.Y.

[73] Assignee: Kenrich Petrochemicals Inc., Bayonne, N.J.

[21] Appl. No.: 861,094

[22] Filed: May 8, 1986

[51] Int. Cl.$^4$ ........................................... D06M 13/26
[52] U.S. Cl. .................................... 252/8.6; 524/176; 524/911; 524/912
[58] Field of Search ................. 252/8.6; 524/176, 398, 524/911, 912

[56] References Cited

U.S. PATENT DOCUMENTS

| | | | |
|---|---|---|---|
| 2,894,966 | 7/1959 | Russell | 556/2 |
| 4,081,383 | 3/1978 | Warburton, Jr. et al. | 252/8.6 |
| 4,124,543 | 11/1978 | Hzuma et al. | 252/8.6 |
| 4,351,738 | 9/1982 | Takahashi et al. | 252/8.7 |
| 4,418,011 | 11/1983 | Bauman et al. | 252/8.6 |
| 4,566,980 | 1/1986 | Smith | 252/8.6 |
| 4,569,772 | 2/1986 | Ciallella | 252/8.6 |

*Primary Examiner*—Paul Lieberman
*Assistant Examiner*—Willie J. Thompson
*Attorney, Agent, or Firm*—Bert J. Lewen; Henry Sternberg

[57] ABSTRACT

A process for rendering polymer compositions antistatic and the products of such process are described. The polymeric material is treated with selected amino and sulfonyl titanates and zirconates. These latter materials are soluble in the polyolefins, polyesters and polystyrenes and remain stable during the processing of these polymers. Furthermore, the antistatic agents of the invention do not "bloom" during the polymer processing.

12 Claims, No Drawings

NON-BLOOMING ANTISTATIC AGENTS

BACKGROUND OF THE INVENTION

It has long been known that it is desirable to prevent static electricity build-up on polymeric materials. For example, in the case of textile materials such as carpets, static electricity builds up when people walk on the carpet, thereby resulting in uncomfortable electric shocks when the walker touches a grounded object. Furthermore, when such static electricity builds up on polymeric material associated with computing equipment (e.g., cabinets and other enclosures), loss of data on electromagnetic media, damage to equipment, and a fire hazard may result.

It has long been an object to increase the conductivity of polymeric materials to some degree, in order to permit the dissipation of the static electric charges. For this purpose, such materials as quaternary ammonium salts, monoacyl glycerides, monoalkyl phosphates and various metalocenes and other surface-active materials have been proposed and/or heretofore employed.

Unfortunately, the foregoing surface-active materials are often only soluble in polymeric materials to a very limited extent and have comparatively low decomposition temperatures, so that during polymer processsing they are effectively destroyed. In addition, it is not uncommon for known surfactant type antistatic agents to "bloom", that is, migrate to the surface of molded articles. Naturally, such blooming reduces the enhancement of the volume conductivity of the polymeric object and renders the antistatic agent of little value, once the surface has been abraded by wear.

The known metalocene based conductive additives primarily based on cobaltocene and other transition metal biscyclopentadiene derivatives suffer from the disadvantages of requiring relatively high proportions (5-20 wt. %) of expensive reagent in order to achieve effective conductivity enhancement, with consequent significant physical property impairments and often intense product discoloration. Such metalocene conductivity enhancers as are presently known cannot be used at temperatures in excess of 200° C. because of their high reactivity and thermal instability, thus preventing their use in polymer systems requiring higher process, application or use temperatures.

BRIEF DESCRIPTION OF THE INVENTION

It has now been discovered that neoalkoxy titanates and zirconates individually and/or collectively having both amino and sulfonyl groups used in selected combinations are outstanding antistatic agents for polyolefinic, substituted polyolefinic, polystyrenic and polyester polymers.

The applicable polyolefinic polymers include homopolymers made by the polymerization of monoolefins having from 2 to 6 carbon atoms, diolefins having from 4 to 10 carbon atoms, and copolymers and terpolymers thereof. Examples of such materials are polyethylene, polypropylene, polybutylene, ethylene-propylene copolymers, ethylene-butylene copolymers, and terpolymers of ethylene, a second olefin such as propylene or butylene, and a minor amount of a diene termonomer such as ethylidene norbornene, cyclopentadiene, and hexadiene-1,6.

The polyesters which may be advantageously employed in conjunction with the antistats of the instant invention are polycondensation products of aliphatic diols and/or triols with aliphatic and/or aromatic dibasic and/or tribasic acids. Individual polyesters as a consequence of their composition may optionally be subjected to secondary cure (thermoset) application for selected applications after admixture with the antistats of the instant invention.

The useful polystyrenic polymers are polymers formed by the polymerization of styrene, alpha-methyl styrene, and copolymers of the aforesaid materials with acrylonitrile, butadiene, and with acrylonitrile and butadiene.

The antistatic agents useful in this invention have the following formulas:

$$ROM(A)_a(B)_b(C)_c \quad (I)$$

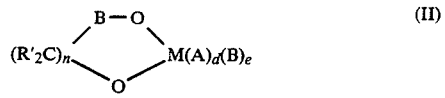

(II)

wherein M is titanium or zirconium, R is a monovalent alkyl, alkenyl, alkynyl, aralkyl, aryl or alkaryl group having up to 20 carbon atoms or an ether substituted derivative thereof; and A is either an oxyalkyl amino, an oxyaryl amino, or a sulfonyl group; B and C are each independently oxyalkylamino, oxyarylamino, sulfonyl, a monovalent aroxy, thioaroxy, diester phosphate, diester pyrophosphate, or a carboxyl group each containing up to 30 carbon atoms; a is 1 to 3; and b+c is 0 to 2; a+b+c is 3; R' is hydrogen or an alkyl group having 1 to 6 carbon atoms; B is a R'C or a carbonyl group; n is 1 or 2; d is 1 or 2; and d+e is 2.

Preferably, in the above formulas a=3 and d=2; that is, all of the hetero atom containing radicals attached to a given M are either oxyalkyl amino and/or oxyaryl amino or sulfonyl. The most preferred embodiments of the instant invention are combinations of either Titanium IV 2,2(bis 2-propenolato-methyl) butanolato, tris dodecylbenzenesulfonato-0 or its Zirconium IV analog with either Titanium IV (2,2-bis 2-propenolatomethyl) butanolate tris 2-ethylenediamino ethanolato or Titanium IV 2,2(bis-2-propenolatomethyl) butanolato. It will be understood that the aforesaid results may also be obtained by using a molecule which contains both the amino and sulfonyl moieties.

DETAILED DESCRIPTION OF THE INVENTION

Generally, from 100 to 10,000 ppm of the antistatic agents is added to the polymer, preferably from 300 to 4500 ppm.

In the case of polyolefinic and polyester materials, most preferably, from 0.7 to 1.2 moles of the neoalkoxy amino compound should be used in combination with each mole of the neoalkoxy sulfonyl compound. Either the zirconates or titanates may be used interchangeably.

With reference to the polystyrenic compounds, it is preferred that from 0.5 to 1.6 moles of the neoalkoxy sulfonyl titanate should be used with each mole of the neoalkoxy amino titanates. The zirconates have been found to be less valuable in this application than the corresponding titanates.

By the practice of the instant invention, an excellent non-blooming antistatic composition is obtained. Typically, in the case of polyethylene, the resistivity is reduced from $10^{16}$ ohm-cm without the antistatic agent to $10^9$ to $10^7$ ohm-cm with the antistatic agent of the invention. In the case of one thermoset (amide-cured) polyester coating, the resistance was reduced from 1200 to approximately 110 ohm-cm. Polystyrenics are reduced from an untreated resistivity of $10^{14}$ ohm-cm down to $10^7$ to $10^9$ ohm-cm. As will be readily understood by those skilled in the art, this decrease in resistivity permits the dissipation of static charges (ESD).

The antistatic compositions of the invention are particularly novel since the antistatic agent is not destroyed even though the polymeric material may be optionally compounded at high temperatures, namely, about 300° C. In addition, the high solubility of the neoalkoxy compound or admixture of same avoids the "blooming" of the effective antistatic agent.

Where the compositions are subject to little thermal stress (that is, formulated, processed, applied and used at temperatures less than 150° C) and admixed with inert solvents such as ethers and hydrocarbons, the broad range of compositions such as described in Formulas I and II above may be used as the antistatic agent. On the other hand, where formulation, processing, application or use temperatures are in excess of 150° C., the chelate-type compounds such as described in Formula II and the compounds of Formula I wherein the R group is a neoalkoxy compound are preferred. Similarly, where reactive solvents are used (such as ketones, esters, alcohols), such compounds are preferred. More specifically, the neoalkoxy compounds are most preferred where ketone and alcohol solvents are employed because these compounds are less reactive than the other compounds disclosed herein. Where ester solvents are used, the chelates are preferred; and the hydroxy acid form is preferred to the glycol form. With regard to systems wherein ketones and peroxide solvents are present, the neoalkoxy zirconate compounds exhibit the most outstanding properties.

The formulated antistatic compounds of the instant invention may optionally also contain organic or inorganic particulate materials. When significant proportions of particulate are present (i.e., in excess of about 5 vol. %), higher proportions of either antistatic agent or combinations thereof may be required in order to achieve adequate ESD activity, since the antistats of this invention may be deactivated by reaction with a wide variety of solid surfaces.

In order to more fully illustrate the advantages of the instant invention, the following examples are set forth. The additives employed are denoted by the codes in Table A.

TABLE A

| Additives | | Molecular Weight |
|---|---|---|
| A | Titanium IV (2,2 bis methyl) propanolato, tris methanesulfonato-O | 421 |
| B | Zirconium IV (2,2 bis methyl) propanolato, tris methanesulfonato-O | 463 |
| C | Titanium IV (2,2 bis 2-propenolatomethyl) butanolato, tris dodecylbenzenesulfonato-O | 1229 |
| D | Zirconium IV (2,2 bis 2 propenolatomethyl) butanolato, tris dodecylbenzenesulfonato-O | 1271 |
| E | Titanium IV bis dodecylsulfonato-O, oxoethylenediolato | 769 |
| F | Zirconium IV bis dodecylsulfonato-O, ethylene diolato | 797 |
| G | Titanium IV 2-propanolato, tris dodecylbenzene sulfonato-O | 1077 |
| H | Titanium IV 2-propanolato, tris(2-ethylene-diamino) ethanolato | 1119 |
| J | Titanium IV (2,2-bis 2-propenolato methyl) butanolato, tris (2-ethylenediamino) ethanolato | 476 |
| K | Zirconium IV (2,2-bis 2-propenolato methyl) butanolato, tris (2-ethylenediamino) ethanolato | 518 |
| L | Titanium IV (2,2-bis 2-propenolato methyl) butanolato, tris (3-amino) phenylato | 432 |
| M | Zirconium IV (2,2-bis 2-propenolato methyl) butanolato, tris (3-amino) phenylato | 474 |
| N | Zirconium IV (2,2-bismethyl)-1,3 propanediolato bis (4-methyl) benzenesulfonato-O | 621 |

EXAMPLE I

This example relates to the use of the organic compounds of the instant invention in a linear low density polyethylene blown film. The particular polyethylene used was Novapol LL 0.02 melt index of Novacor Corp., Alberta, Canada. The blow molder was a Bekum 121 (Bekum Corp., Hamburg, Germany) and the process temperature used was 440°–460° F. The parts by weight of the additive are set forth in the table below. These were spray applied in a Welex mixer at 5 wt. % and diluted to use value by serial dilution prior to molding. The product was a 3 mil thick film.

| Test No. | Additive(s) | ppm | Resistivity ohm cm | Comments |
|---|---|---|---|---|
| 1 | None | — | $1 \times 10^{16}$ | Film translucent |
| 2 | C | 1000 | $1 \times 10^{14}$ | " |
| 3 | D | " | $3 \times 10^{14}$ | " |
| 4 | E | " | $5 \times 10^{15}$ | " |
| 5 | F | " | $3 \times 10^{14}$ | " |
| 6 | G | " | $6 \times 10^{15}$ | Decomposition evident - film nonuniform |
| 7 | H | " | $2 \times 10^{15}$ | Decomposition evident - film nonuniform |
| 8 | J | " | $5 \times 10^{13}$ | Surface bloom evident |
| 9 | K | " | $2 \times 10^{13}$ | " |
| 10 | C/J | 500/500 | $4 \times 10^9$ | Film translucent |
| 11 | E/K | 500/500 | $8 \times 10^9$ | " |

This example shows that a combination of organometallic sulfonates and amino compounds of the instant invention may be collectively employed as efficient antistatic agents at combined levels of the order of 0.1 wt. % of resin, whereas individually neither they nor their analogs are effective at such levels.

EXAMPLE II

A high density polyethylene (Amoco 403F) was extruded in an NRM Twinch 24:1 L/D with 18"×15 mil sheet die and a Gatto takeoff system at an extrusion profile of 450°–480° F. The parts per million of additive are shown in the table below. The additive was added as a 65 wt. % powder concentrate on a precipitated silica carrier. The product was a 15 mil sheet.

| Test No. | Additive(s) | ppm | Resistivity ohm cm | Comments |
|---|---|---|---|---|
| 1 | None | — | $1 \times 10^{16}$ | |
| 2 | A | 2000 | $4 \times 10^{15}$ | Surface bloom |
| 3 | B | " | $3 \times 10^{14}$ | " |
| 4 | K | " | $9 \times 10^{12}$ | " |
| 5 | L | " | $5 \times 10^{13}$ | " |
| 6 | A/L | 500/500 | $3 \times 10^{11}$ | Translucent |
| 7 | A/L | 1000/1000 | $9 \times 10^9$ | " |
| 8 | A/L | 300/300 | $9 \times 10^{11}$ | " |
| 9 | E/K | 1000/1000 | $4 \times 10^9$ | " |
| 10 | E/K | 1194/806 | $9 \times 10^7$ | " |

| Test No. | Additive(s) | ppm | Resistivity ohm cm | Comments |
|---|---|---|---|---|
| 11 | D/J | 1000/1000 | $3 \times 10^{10}$ | " |
| 12 | D/J | 1492/508 | $1 \times 10^{8}$ | " |
| 13 | D/J | 1746/254 | $5 \times 10^{10}$ | Slight bloom |
| 14 | D/J | 1524/476 | $7 \times 10^{10}$ | " |

This example shows that combinations of amino titanium IV/zirconium IV derivatives with sulfonato-O derivatives of titanium IV/zirconium IV are collectively useful non-blooming antistats for HDPE when used in the 600-2000 ppm range and that use of said combinations in equivalent molar proportions provides higher performance than in other ratios.

EXAMPLE III

An acrylonitrile-butadiene-styrene polymer designated Lustran HR 850 (Monsanto) was injection molded on a 3 oz. New Britain 75 ton machine using ss mold at a temperature of 520° F. To prepare the samples, the concentration of additive shown in the following table was tumble blended with an appropriate quantity of additive (as a 65% active powder concentrate on precipitated silica) and the ABS resin prior to molding.

| Additive | ppm | Resistivity ohm cm |
|---|---|---|
| None | — | $8 \times 10^{15}$ |
| C | 200 | $9 \times 10^{14}$ |
| D | 200 | $8 \times 10^{14}$ |
| J | 200 | $6 \times 10^{13}$ |
| M | 200 | $5 \times 10^{14}$ |
| C/J | 144/56 | $6 \times 10^{10}$ |
| D/M | 146/54 | $4 \times 10^{10}$ |
| L/N | 120/80 | $7 \times 10^{10}$ |

Example III shows the efficacy of the combinations of the instant invention as antistats in injection molded ABS after exposure to process temperatures in excess of 500° F.

EXAMPLE IV

A toluene solution of acrylic resin containing 10 wt. % of B66 Acrylic (Rohm & Haas, Philadelphia, Pa.) was prepared at ambient temperature. The resin solution was then modified by the addition of the additive(s) in ppm by weight on acrylic resin shown in the following table. The resulting solution was drawn down to 50 mils with a doctor blade on polyethylene sheet. The solvent was permitted to evaporate at ambient temperature for 3 days prior to measurement of resistivity of the resulting coating. The nominal thickness of the cast sheet was 5 mil.

| Additive | ppm | Resistivity ohm cm |
|---|---|---|
| None | — | $9 \times 10^{13}$ |
| C/L | 1500/390 | $8 \times 10^{8}$ |
| D/J | 1721/645 | $6 \times 10^{7}$ |
| E/K | 1480/1000 | $7 \times 10^{8}$ |
| G/H | 2000/2000 | $5 \times 10^{7}$ |
| D/M | 150/56 | $3 \times 10^{10}$ |

Example IV shows the efficacy of the combinations of the instant invention as antistats in cast acrylic resin when used as 200-4000 ppm additives.

We claim:

1. An antistatic composition comprising a polymeric material selected from polyolefins, polystyrenic and polyester polymers having admixed therewith from 100 to 10,000 ppm of an antistatic agent which is an amino or sulfonyl titanate or zirconate.

2. The composition of claim 1 wherein the polymeric material is a polyolefin or a polyester.

3. The composition of claim 1 wherein the polymeric material is a polystyrenic compound.

4. The composition of claim 2 wherein the antistatic agent is a combination of an amino titanate or zirconate and an sulfonyl titanate or zirconate.

5. The composition of claim 3 wherein the antistatic agent is a combination of an amino titanate and an sulfonyl titanate.

6. The composition of claim 1 wherein the antistatic agent is present in an amount of from 200 to 4500 ppm based on polymer.

7. The composition of claim 1 wherein the polyolefin is a polymer of an olefin containing from 2 to 6 carbon atoms, a copolymer of such polyolefin, or a terpolymer of such polyolefin.

8. The composition of claim 7 wherein the polyolefin is polyethylene, polypropylene, a copolymer of ethylene and propylene, or a terpolymer of ethylene, propylene and a diene.

9. The composition of claim 3 wherein the polystyrenic compound is a polymer of styrene, alphamethyl styrene, or a copolymer of acrylonitrile-butadiene-styrene, styreneacrylonitrile or butadiene-styrene.

10. The composition of claim 1 wherein the antistatic agent has the following formula:

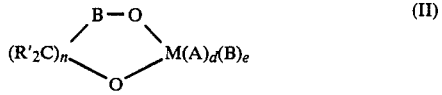

wherein M is titanium or zirconium, R is a monovalent alkyl, alkenyl, alkynyl, aralkyl, aryl or alkaryl group having up to 20 carbon atoms or an ether substituted derivative thereof; and A is either an oxyalkyl amino, an oxyaryl amino, or a sulfonyl group; B and C are each independently oxyalkylamino, oxyarylamino, sulfonyl, a monovalent aroxy, thioaroxy, diester phosphate, diester pyrophosphate, or a carboxyl group each containing up to 30 carbon atoms; a is 1 to 3; and b+c is 0 2; a+b+c is 3; R' is hydrogen or an alkyl group having 1 to 6 carbon atoms; B is a R'C or a carbonyl group; n is 1 or 2; d is 1 or 2; and d+e is 2.

11. The composition of claim 10 wherein a=3 and d=2.

12. The composition of claim 10 wherein the sulfonyl compound is titanium IV or zirconium IV 2,2(bis-2-propenolatomethyl) butanolato, tris dodecylbenzenesulfonato-O and the amino compound is titanium IV (2,2-bis-2-propenolatomethyl) butanolate tris 2-ethylenediamino ethanolato or titanium IV 2,2(bis-2-propenolatomethyl) butanolato.

* * * * *

UNITED STATES PATENT AND TRADEMARK OFFICE
CERTIFICATE OF CORRECTION

PATENT NO. : 4,715,968

DATED : December 29, 1987

INVENTOR(S) : Gerald Sugerman et al.

It is certified that error appears in the above-identified patent and that said Letters Patent is hereby corrected as shown below:

Column 6, claim 10, line 53, after "0 ", insert --to--.

Signed and Sealed this

Third Day of May, 1988

Attest:

DONALD J. QUIGG

Attesting Officer

Commissioner of Patents and Trademarks